US010858858B1

(12) United States Patent
Miller, Sr.

(10) Patent No.: US 10,858,858 B1
(45) Date of Patent: Dec. 8, 2020

(54) DEVICE FOR INSTALLING A FENCE

(71) Applicant: Quik-Link, LLC, Branford, CT (US)

(72) Inventor: Robert T. Miller, Sr., Branford, CT (US)

(73) Assignee: Quik-Link, LLC, Branford, CT (US)

( * ) Notice: Subject to any disclaimer, the term of this patent is extended or adjusted under 35 U.S.C. 154(b) by 0 days.

(21) Appl. No.: 16/820,792

(22) Filed: Mar. 17, 2020

(51) Int. Cl.
*E04H 17/26* (2006.01)
*B60P 3/00* (2006.01)
*E04H 17/02* (2006.01)

(52) U.S. Cl.
CPC ............... *E04H 17/26* (2013.01); *B60P 3/00* (2013.01); *E04H 17/02* (2013.01)

(58) Field of Classification Search
CPC ....... E04H 17/02; E04H 17/26; E04H 17/266; B65H 49/32
See application file for complete search history.

(56) References Cited

U.S. PATENT DOCUMENTS

| | | | | | |
|---|---|---|---|---|---|
| 2,611,498 | A | * | 9/1952 | Charles | B66F 9/184 414/620 |
| 2,914,270 | A | * | 11/1959 | Parker | B65H 49/32 242/390.7 |
| 3,048,348 | A | * | 8/1962 | Griffin | B65H 49/32 242/422.5 |
| 4,930,718 | A | * | 6/1990 | Lancour | B65H 49/32 242/557 |
| 5,163,634 | A | * | 11/1992 | Moon | E04H 17/266 140/123.5 |
| 5,553,807 | A | * | 9/1996 | Lopez | B65H 16/02 242/557 |
| 5,582,216 | A | * | 12/1996 | Smith | B21F 33/00 140/107 |
| 5,806,779 | A | * | 9/1998 | Crum | E04H 17/266 242/399.1 |
| 6,042,046 | A | * | 3/2000 | Beyer, Sr. | B65H 49/32 242/399.1 |
| 6,260,790 | B1 | * | 7/2001 | Harrah | B65H 49/30 242/403 |

(Continued)

OTHER PUBLICATIONS

Fence Hog Skid Steer Fence Installer (Attachment A)—https://www.skidsteersolutions.com/flence-hog-skid-steer-fence-installer-ez-grout/. Accessed Feb. 24, 2020.

(Continued)

*Primary Examiner* — Michael E Gallion
(74) *Attorney, Agent, or Firm* — IP Attorneys Group, LLC

(57) ABSTRACT

The present invention relates to a device for installing a fence. In most embodiments the device comprises three main areas: the driver area, the installer area, and the storage area. The driver area is where the driver of the device is located and comprises the necessary components to drive the device, such as a motor and steering mechanism. The installer area is where the fence installer is located, and in most embodiments is placed above the driver area so that the installer can access the top rail of the fence during installation. The storage area is where the fencing material is placed, often times as a roll. This roll is fed out of the storage area and installed by the installer while the device is driven down the length of the fence. This device beneficially decreases the amount of time and man-power required to install a fence.

18 Claims, 6 Drawing Sheets

(56) References Cited

U.S. PATENT DOCUMENTS

| | | | | |
|---|---|---|---|---|
| 6,685,132 B1* | 2/2004 | Allen | .................... | B65H 49/32 |
| | | | | 242/557 |
| 7,143,971 B2* | 12/2006 | Yoder | ................. | B65H 16/103 |
| | | | | 242/390 |
| 7,389,957 B1* | 6/2008 | Struksnes | ............... | E01C 23/03 |
| | | | | 242/403 |
| 7,614,581 B2* | 11/2009 | Beem | .................... | E04H 17/266 |
| | | | | 242/403 |
| 8,702,030 B1* | 4/2014 | Gilham, Jr. | ............... | E04H 4/14 |
| | | | | 242/405 |
| 10,196,229 B2* | 2/2019 | Smith | .................... | B65H 49/32 |
| 10,246,283 B2* | 4/2019 | Gardner | ............... | B65H 16/005 |
| 10,533,341 B1* | 1/2020 | Hicks | .................... | B65H 75/425 |
| 10,654,395 B1* | 5/2020 | White | .................... | B60P 3/035 |
| 2003/0080236 A1* | 5/2003 | Armstrong | ............ | E04H 17/266 |
| | | | | 242/557 |
| 2007/0210202 A1* | 9/2007 | Miller | ................... | B65H 16/04 |
| | | | | 242/557 |
| 2011/0121125 A1* | 5/2011 | Stow | ....................... | B66F 9/184 |
| | | | | 242/557 |

OTHER PUBLICATIONS

Installink Fence Dispencer (Attachment B)—https://www.lcenterprises-usa.com/installink-fence-dispensed. Accessed Feb. 24, 2020.

\* cited by examiner

DEVICE FOR INSTALLING A FENCE

BACKGROUND OF THE INVENTION

The present invention relates to a device for installing a fence. Often individuals or companies will put a fence around their property to denote property lines, deter others from entering the property, or for keeping small children or animals within the property. Fences can be built in a variety of styles, such as chain link, picket, estate, solid panel, welded wire, or cross rail. Many types of fences involve at least two vertical posts with a top and bottom horizontal rail placed between the posts. Often the intermediary sections of the fence, such as the chain link wire or picket sections, are secured to these posts and rails. While for some constructions, such as picket fences, the intermediary sections are individual pieces, in others, such as chain link, the intermediary section comes in a roll. In some of these fence types which use a roll, these rolls can be hundreds of pounds, depending on the length, height, and width of the material, which can cause these rolls to be unwieldy and difficult to maneuver.

In order to install a fence that uses a roll of intermediary material, often several individuals are required to unroll the roll while others secure it to the posts and rails. For fences which are taller than six feet, or taller than the average installer, ladders or other similar tools are often required to lift the installer up to the top rail to secure the intermediate section. These ladders typically have to be moved manually or on a truck every few feet along the length of the fence. Alternatively, the roll is completely opened and lifted up onto the posts and rails and subsequently secured, which again can take several individuals, depending on the length and weight of the fence being installed. During these steps, it is often important to keep tension in the fencing so that there is not excess slack which would cause a gap where smaller animals or humans could pass through. Especially for industrial or farm purposes, where fences can cover hundreds of acres, fully unrolling the roll can be unfeasible, and keeping tension while slowly unrolling a roll and moving ladders is often difficult, time consuming, labor intensive, and typically requires a large number of individuals.

In order to address these issues, some have made attachments for the front of construction vehicles which can carry or dispense rolls of fence material. However, typically construction vehicles cannot drive on fresh grass or other non-rugged terrain without damaging the terrain, which thus limits the areas where one can use these attachments. Additionally, these attachments are often focused on the transport and dispensing of the fence material, but not on the labor-intensive installation of the fence material.

In light of these difficulties often faced when constructing a fence with a roll, a new solution for installing these fences is required. Ideally this solution should include the ability to transport and unroll the roll, maintain tautness of the roll, and raise at least one installer off of the ground so that they can reach higher fence rails then they would on the ground. Additionally, allowing this solution to be motorized would reduce the time and laborers needed to complete the task.

SUMMARY OF THE INVENTION

The present invention relates to a device for installing a fence. In some embodiments the device comprises three main areas, a driver area, an installer area, and a storage area. In many embodiments the storage area comprises two positions, a loading and a dispensing position, and further comprises a loading mechanism and a dispensing mechanism. In most embodiments with these positions and mechanisms, an object is place within the storage area when in the loading position and dispensed out of the storage area when in the dispensing position. In many embodiments the storage area is placed in front of the driver and installer areas.

In some embodiments the loading mechanism is a door that opens and closes. In some embodiments the door opens and closes vertically and in others it opens and closes horizontally. In some embodiments the door is opened and closed mechanically and in others it is opened and closed manually. In some embodiments the dispensing mechanism is a track and a guard. In other embodiments a gap in provided in the storage area which aids the dispensing of the object placed inside of the storage area. In some embodiments the base of the storage area is rotatable and in others it is fixed.

In some embodiments more than one installer area is provided. In some embodiments these installer areas are at different vertical heights. In some embodiments the height of one or more of the installer areas are adjustable. In some embodiments one or more of the installer areas are removably attachable. In many embodiments one or more of the installer areas are raised off of the ground, and in some embodiments a ladder is provided to help the installer up to the installer area. In many embodiments the installer area further comprises a base and a rail. In some embodiments with a rail on the installer area, a door is provided.

In many embodiments the device further comprises the items selected from the group comprising a motor, a seat, at least one wheel, a steering mechanism, a velocity mechanism, a breaking mechanism, and combinations thereof. In some embodiments at least some of the wheels are further equipped with a track. In some embodiments the device is one unit which propels and drives itself, and in others it is attached to a motor vehicle.

DETAILED DESCRIPTION OF THE INVENTION

Figure 2:
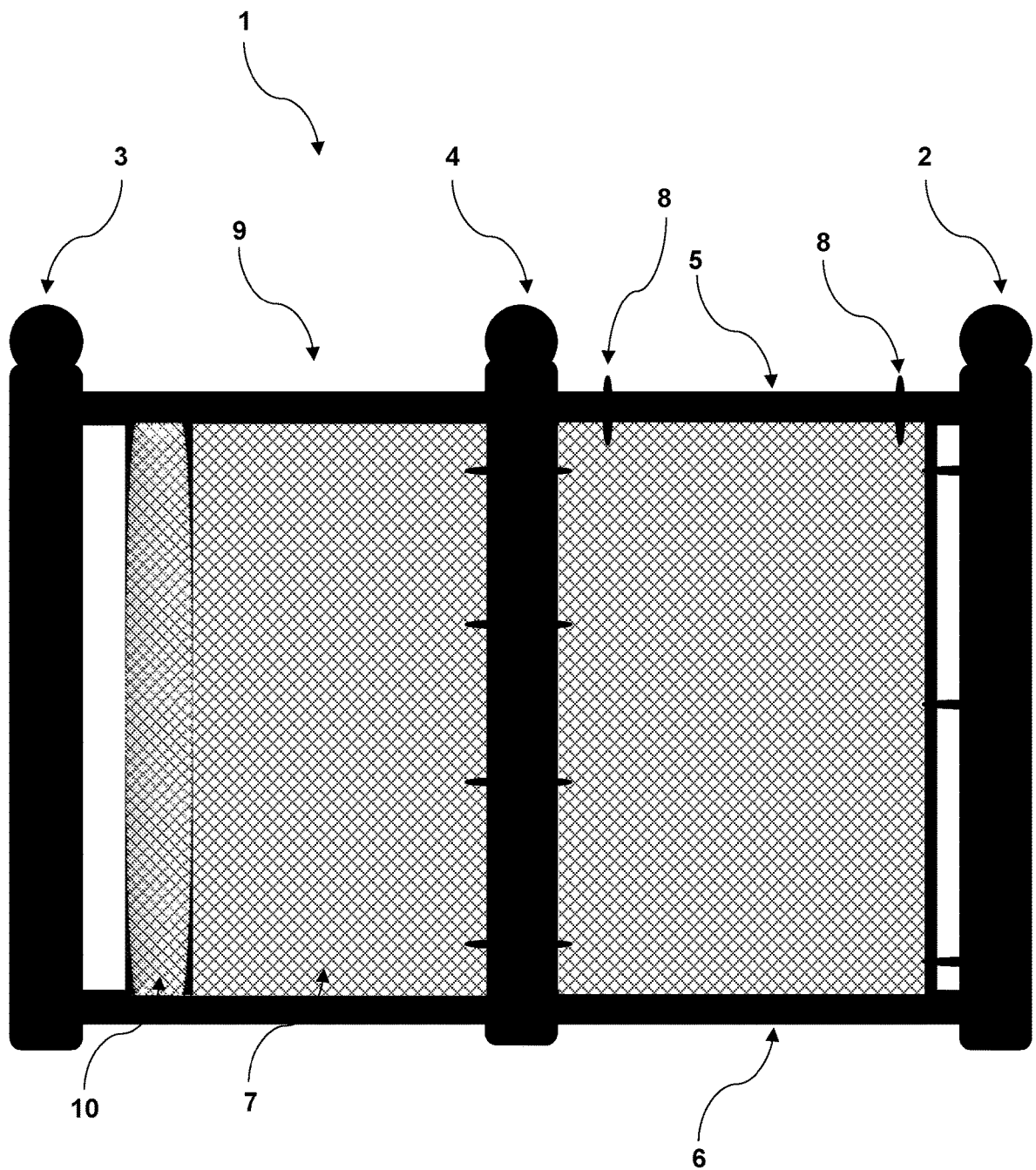
FIG. 2 shows a fence which is installed by the device shown in FIG. 1.

The present invention relates to a device for installing a fence. As seen in FIG. 2, in many embodiments fence 1 comprises a frame (9) comprising beginning post (2), a terminal post (3) and at least one intermediary post (4). In some embodiments there are no intermediary posts 4 and in others there are multiple intermediary posts 4. Intermediary posts 4 help maintain the structure and support of fence 1, and thus the length of fence 1 determines the number of intermediary posts 4 needed. In most embodiments, frame 9 of fence 1 also comprises a top rail (5) and a bottom rail (6) which run horizontally between the vertical beginning 2 and terminal 3 posts. In some embodiments no bottom rail 6 is provided, in others no top rail 5 is provided, and in others neither rail is provided. The weight of intermediary material 7, and the required stability and longevity of fence 1 determine the required number and type of rails.

Also placed between the beginning 2 and terminal 3 posts in most embodiments is intermediary material 7, which generally fills the space between the vertical posts. In most embodiments intermediary material 7 is secured to at least one portion of frame 9. The securing of intermediary material 7 is completed by the method consisting of nailing, tying, screwing, gluing, stapling, pinning, taping, adhering, latching, hooking, locking, hanging, clamping, binding, melding, melting, and combinations thereof. In the embodiment shown in FIG. 2, intermediary material 7 is secured to frame 9 by ties 8.

In some embodiments, intermediary material 7 is a solid section which leaves no gaps between the first and second posts, in other embodiments intermediary material 7 is a vertical slat which leaves no gaps between top rail 5 and bottom rail 6 but does leave gaps between the first and second vertical posts, in other embodiments intermediary material 7 is a horizontal slat which leaves no gaps between the first and second vertical posts, but does leave gaps between the top and bottom rails, in other embodiments intermediary material 7 is a diagonal slat, and in other embodiments intermediary material 7 is a mesh or patterned material, as shown in FIG. 2. In some embodiments intermediary material 7 is provided in a roll (10), as shown in FIG. 2.

Figure 1:
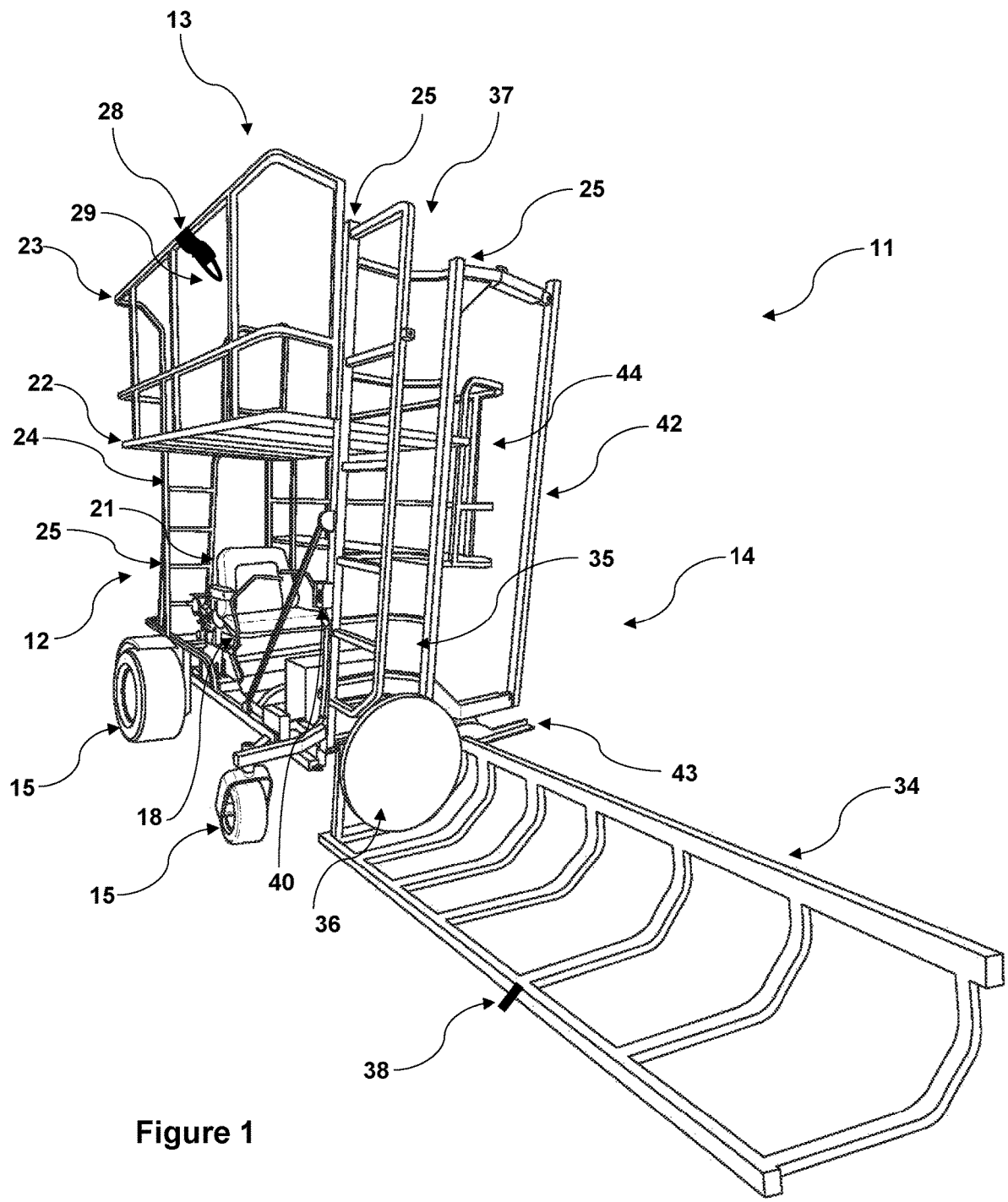
FIG. 1 shows a front perspective view of a device for installing a fence according to one embodiment of the invention.

FIG. 1 shows a device for installing a fence according to one embodiment of the invention. As shown in FIG. 1, in many embodiments device 11 comprises three main areas, the driver area (12), the installer area (13), and the storage area (14). In most embodiments the driver faces the front of device 11. In most embodiments the frame of device 11 is made of metal. In most of these metal embodiments the metal is steel. In some embodiments the steel is not coated and in others the steel is coated to avoid rusting of the steel. In other embodiments the frame of device 11 is made of other hard materials selected from the group comprising wood, plastic, metal, and combinations thereof.

In many embodiments, device 11 comprises wheels 15 operated by motor 16. In some embodiments device 11 is propelled by rear-wheel drive, in others by front-wheel drive, and in others by all-wheel drive. In most embodiments the front wheels rotate which turns device 11, but in other embodiments all of the wheels 15 rotate. In most embodiments four wheels 15 are provided, two in the front and two in the back, but in other embodiments only three wheels 15 are provided, with the single wheel 15 being placed in either the front or back. In other embodiments more than four wheels 15 are provided. In many embodiments wheels 15 are designed such that they can drive on grass and other surfaces without substantially destroying it.

In some embodiments wheels 15 are further equipped with tracks or treads. In some embodiments each wheel is equipped with an individual track and in others the front and back wheels are connected by a continuous track. These tracks beneficially allow more surface area and traction for wheels 15 and thus are better equipped for rugged or unfinished terrain. In some embodiments wheels with and without tracks are interchangeable. In some embodiments all wheels 15 are equipped with tracks and in others only some of the wheels 15 are equipped with tracks. In some embodiments wheels 15 are bearings.

In most embodiments motor 16 is located in driver area 12. In some embodiments motor 16 is located at the front of device 11, in others it is located at the back of device 11, and in others near the middle. In many embodiments, motor 16 is placed on the opposite side of the storage area 14, which helps distribute the weight of the materials within storage area 14. In many embodiments motor 16 is additionally located above and connected to the wheels which propel device 11. In most embodiments, motor 16 is powered by the energy source chosen from the group consisting of electric, battery, natural gas, gasoline, diesel, oil, and combinations thereof. As the weight of the intermediary material 7 varies, the horsepower of motor 16 also varies in the different embodiments. For smaller weights and lower costs, in some embodiments motor 16 has a horsepower under about 15. In other embodiments the horsepower of motor 16 is between 15 and 50. For heavy loads but higher costs, in some embodiments the horsepower of motor 16 is over 50.

In most embodiment, included with motor 16 are all the parts required to have a functioning motor. These parts would include but are not limited to gear shaft, ignition mechanism, starter, air filter, carburetor, drive belt, dipstick, fuel cap, fuel filter, ignition coil, spark plug, fuel tank/cell, and transmission.

In most embodiments, driver area 12 is where the movement of device 11 is controlled. As discussed above, in many embodiments motor 16 is located in this area. Also placed within driver area 12 in most embodiments are velocity mechanism 17, steering mechanism 18, and braking mechanism 19. In most embodiments velocity mechanism 17 is in communication with motor 16, and steering mechanism 18 and braking mechanism 19 are in communication with at least one of the wheels 15.

The structure of velocity mechanism 17 is selected from the devices consisting of pedal, lever, button, switch, stick, and combinations thereof. In most embodiments, the further velocity mechanism 17 is pressed in one direction the faster device 11 will move. For example, the further a pedal is pressed downwards, the more energy motor 16 will exert and the faster device 11 will be propelled forward.

The structure of steering mechanism 18 is selected from the devices consisting of shaft, wheel, rod, joystick, lever, and combinations thereof. In some embodiments steering mechanism 18 is a single device, such as a single steering wheel which is connected to two different wheels 15 and which rotates both wheels 15 at the same time. In other embodiments steering mechanism 18 is multiple devices, such as two levers, each of which is connected to and steers a separate wheel 15.

The structure of braking mechanism 19 is selected from the devices consisting of pedal, lever, button, switch, stick, and combinations thereof. In most embodiments, the further braking mechanism 19 is pressed in one direction the slower device 11 will move. For example, the further a pedal is pressed downwards, the more force a brake pad or similar object exerts on wheel 15, which causes device 11 to be propelled forward more slowly until it eventually stops its forward movement.

In some embodiments seat 21 is provided in driver area 12 so that the driver can sit while driving device 11. In some embodiments seat 21 can be flipped forward to access items under it. In some embodiments a battery or other motor components are stored under seat 21 and accessed in this way. In other embodiments no seat 21 is provided and the driver stands or sits upon other areas within driver area 12. In other embodiments other amenities are placed within driver area 12, selected from the group consisting of cupholder, tool box, heater, fan, speaker, radio, CD player, MP3 player, audio jack, Bluetooth device, and combinations thereof.

In some embodiments, screen 48 is provided at the front of driver area 12. In most embodiments with screen 48, this screen is connected to a camera in the front and back of device 11. When driving forward, the view of the camera in the front of device 11 is shown on screen 48, and when driving backwards, the view of the camera in the back of device 11 is shown on screen 48. These cameras aid the driver and give better views of what is in front of and behind device 11. These embodiments are useful when storage area 14 is located in the front of device 11, which can limit the front view of the driver. In some embodiments only a front camera is provided and in others only a rear camera is provided. In other embodiments screen 48 is a touch screen and operates at least some of the functions of device 11, such as motor 16, wheels 15, or lift control 40. In some embodiments the driver controls the movement of device 11 via screen 48.

In some embodiments driver area 12 is enclosed and in others it is open. Open driver area 12 is useful as it gives more visibility and ability to communicate with the installer in installer area 13. An enclosed driver area 12 is useful as it protects the driver as well as the equipment within driver area 12 from elements which can damage the equipment. In some embodiments with an enclosed driver area 12, air conditioning and heat are provided. In other embodiments with an enclosed driver area 12, a door is provided to allow the driver to access driver area 12. In most embodiments at least a part of the material used to enclose driver area 12 is able to be seen through such that the driver can see where they are going. In some embodiments this see-through area is selected from the group comprising glass, plastic, or combinations thereof. In other embodiments, materials selected from the group consisting of glass, plastic, metal, wood, or combinations thereof make up the rest of the enclosure.

In most embodiments, above driver area 12 is installer area 13. In most embodiments installer area 13 comprises base 22 and guard rail 23. In most embodiments ladder 24 is also provided which aids the installer in getting up to base 22. In some embodiments no ladder 24 is provided and the installer must get up to base 22 by another means, for example a lift, a step stool, or another ladder. In some embodiments ladder 24 is fixed to device 11 and in others it is removable. A removable ladder 24 helps reduce the overall weight of device 11, which then causes motor 16 to use less fuel, but a fixed ladder 24 avoids the risk of ladder 24 being lost, and is always available to the installer. In some embodiments ladder 24 shifts around at least a portion of driver area 13 and in others it is fixed in place. A shifting ladder 24 allows the installer to access installer area 13 from any direction, but a fixed ladder is more secure and stable.

Figure 4:
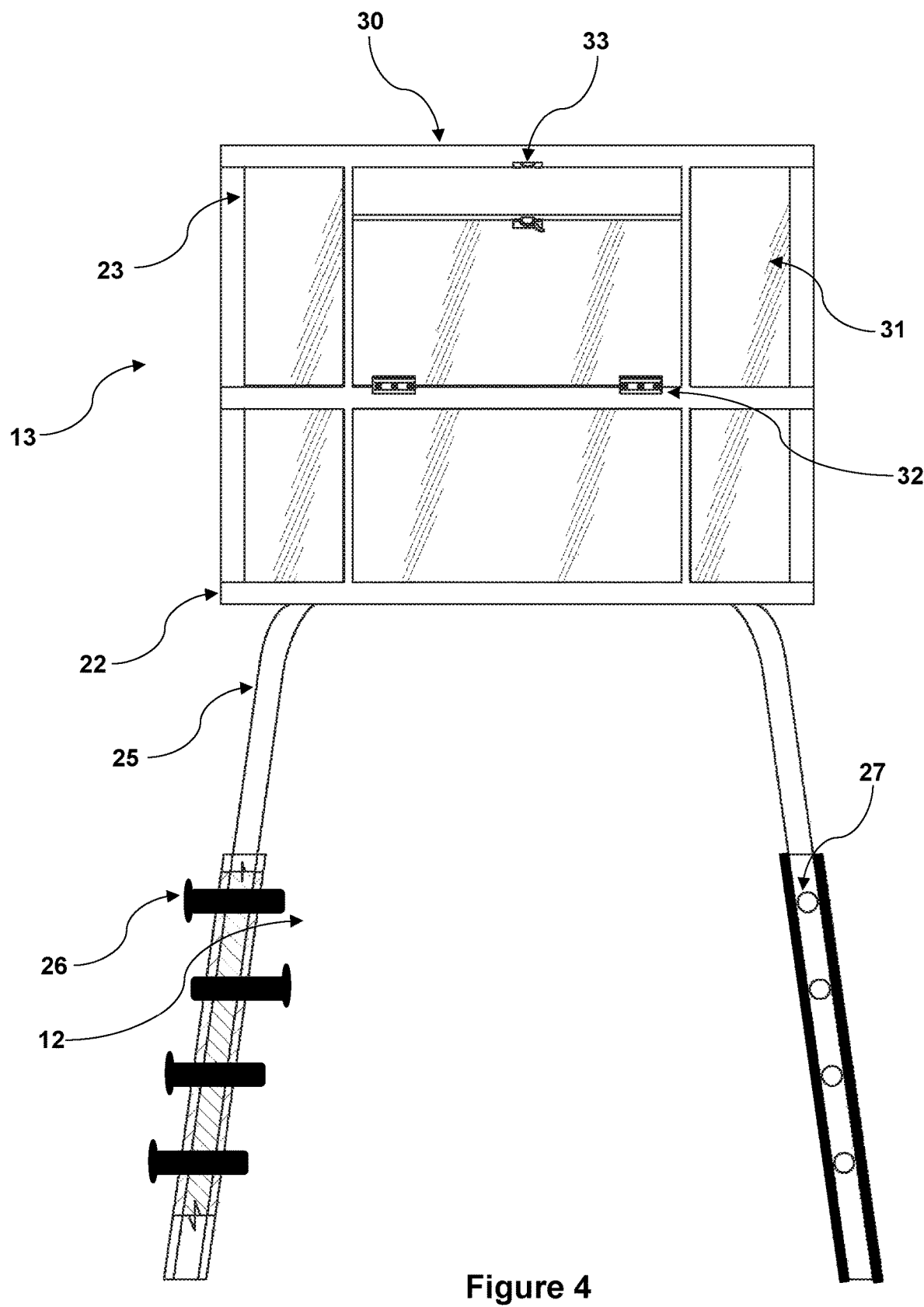
FIG. 4 shows a detailed view of one embodiment of the installer area of the device for installing a fence shown in FIG. 1.

In most embodiments, base 22 is supported by base support 25. In some embodiments base support 25 is a series of vertical columns, and in other embodiments base support 25 is a single vertical column. In some embodiments multiple base supports 25 are placed around the area of base 22. In some embodiments the vertical post of storage area 14 acts as a base support 25, as seen in FIG. 1. In other embodiments ladder 24 acts as a base support 25. In some embodiments base support 25 is fixed, and in other embodiments base support 25 is adjustable. A fixed base support 25 gives ease of construction and is also more stable, but an adjustable base support 25 allows the installer to reach a variety of heights. As seen in FIG. 4, in some embodiments bolts 26 fit inside hole 27 and hold installer area 13 in place. In some embodiments with an adjustable base support 25, these bolts 26 have the ability to removed and installer area 13 has the ability to be manually shifted up and down within telescopically engaged base support 25. In other embodiments bolts 26 are replaced with pins, or other similar securing pieces. In some embodiments, instead of bolt 26 being removed, they are pushed within base support 25 via a spring which automatically springs bolt 26 into the next available hole 27 as base support 25 is shifted up or down. In other embodiments base support 25 is equipped with a mechanical lift or a hydraulic lift which mechanically shifts installer area 13 up or down. These automatic lifts allow for easier and less labor-intensive vertical shifts which can be useful as it allows the installer to access different areas of fence 1 while installing, without having to stop and manually shift the vertical height of installer area 13. However, these lifts also add significant costs and complexity to the manufacturing of device 11.

Figure 3:
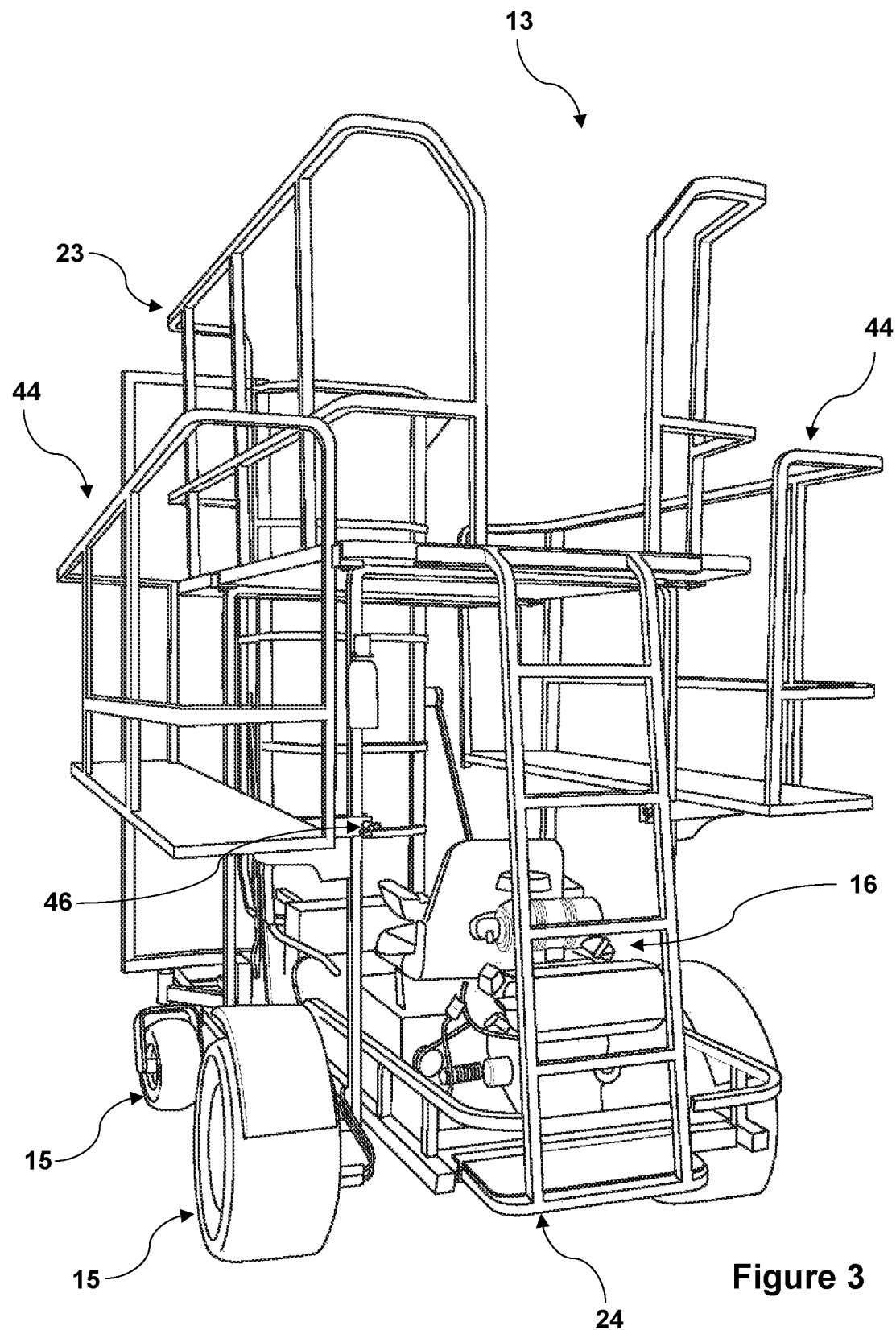
FIG. 3 shows a back perspective view of the device for installing a fence shown in FIG. 1.

In some embodiments, only one installer area 13 is provided, and in others multiple installer areas 13 are provided. As shown in FIG. 3, in some embodiments with multiple installer areas 13, these different areas are at different heights. This allows the installer to access different areas of fence 1 without the need to have an installer area 13 which shifts vertically. In many embodiments where subsequent installer areas 13 are provided they are secured to either base 22 or base support 25. In some embodiments, additional installer areas 13 are provided on both sides of device 11 such that fence 1 can be installed while device 11 is driving in either direction. In other embodiments only one side of device 11 is equipped with an additional installer area 13 to reduce manufacturing costs.

In some embodiments the primary installer area 13 is fixed to base support 25 while the second side installer area 44 is adjustable. As with the discussion of base support 25 above, in some embodiments base support 25 and side installer area 44 are further equipped with hole 45 which bolt 46 fits into to hold side installer area 44 at the desired height. In some embodiments with side installer area 44, these bolts 46 have the ability to removed and side installer area 44 has the ability to be manually shifted up and down along base support 25. In many of these embodiments, side installer area 44 can be removed from device 11 if desired. These embodiments help reduce the weight of device 11 and removed side installer area 44 from obstructing the installer or driver if not needed for the current job. In other embodiments bolts 46 are replaced with pins, or other similar securing pieces. In some embodiments side installer area 44 is connected to base support 25 via a track, and in others, installer area 44 is integrally connected to base support 25. In these connected embodiments side installer area 44 cannot be removed from device 11. These embodiments beneficially prevent side installer area 44 from being misplaced when removed. In some of these connected embodiments, instead of bolt 46 being removed, they are pushed within base support 25 via a spring which automatically springs bolt 46 into the next available hole 45 as side installer area 44 is shifted up or down. In other embodiments, base support 25 is equipped with a mechanical lift or a hydraulic lift which mechanically shifts side installer area 44 up or down. These automatic lifts allow for easier and less labor-intensive vertical shifts which can be useful as it allows the installer to access different areas of fence 1 while installing, without having to stop and manually shift the vertical height of side installer area 44. However, these lifts also add significant costs and complexity to the manufacturing of device 11.

In some embodiments the height of adjustable side installer area 44 or primary installer area 13 is selected from standard fencing heights. In some embodiments these heights are selected from the group consisting of zero feet above the ground, six feet above the ground, eight feet above the ground, ten feet above the ground, twelve feet above the ground, sixteen feet above the ground, and combinations thereof. In other embodiments the heights are spaced every 1 foot above the ground for more diverse usage.

In most embodiments with an installer area 13, rail 23 is provided above base 22, which protects the installer from falling off of base 22. In some embodiments rail 23 extends less than three feet from the top of base 22, in other embodiments rail 23 extends three to six feet from the top of base 22 and in other embodiments rail 23 extends over six feet from the top of base 22. The different rail heights are important as different installers are different heights and thus need a different rail 23 heights to access fence 1 from installer area 13, while being protected from falling out of installer area 13. As with base support 25, in some embodiments rail 23 is fixed and in others it is adjustable. The mechanisms for adjusting rail 23 are similar to the ones discussed above for base support 25. In some embodiments rail 23 is provided with strap 28 which further secures the installer to installer area 13. In some embodiments strap 28 is tied to rail 23 and the installer, and in other embodiments one or more hooks 29 are provided which can hook to the installer's belt, safety harness, or other item on the installer.

In many embodiments door 47 is provided where ladder 24 meets installer area 13. Door 47 beneficially closes behind the installer and provides safety from falling out of the gap where the user accesses installer area 13. In some embodiments no door is provided and an open gap is provided in rail 23.

As seen in FIG. 4, in some embodiments installer area 13 is provided with roof 30 which is secured to rail 23, and in other embodiments, such as the one shown in FIG. 1, no roof 30 is provided. Roof 30 beneficially protects the installer from harmful UV radiation as well as partially protects them from the elements. Also seen in FIG. 4, in some embodiments a wall 31 is provided around installer area 13. Importantly, in most embodiments at least a portion of installer area 13 should be left open, or have the ability to be opened, such that the installer can access fence 1 and storage area 14. In some embodiments wall 31 is secured to and encloses the area covered by rail 23, and in some embodiments wall 31 extends above rail 23. In some embodiments wall 31 has hinge 32 on rail 23, which allows it to fold down such that it can be closed to protect the installer but hinged open when the installer needs to access external components. In many of these embodiments, latch 33 is provided which secures wall 31 in the closed position. In some embodiments, wall 31 is flexible and placed on a track such that it can be shifted around the perimeter of rail 23. In some embodiments, the entire wall 31 is placed on the track, and the whole wall 31 is shifted to allow protection and openings where desired. In other embodiments only a part of wall 31 is on the track and the rest is secured. These embodiments beneficially allow for a portion of wall 31 to be shifted opened or closed. As with the enclosure of driver area 12, In most embodiments at least a part of wall 31 is able to be seen through such that the installer can see their surroundings. In some embodiments this see-through area is selected from the group comprising glass, plastic, or combinations thereof. In other embodiments materials selected from the group consisting of glass, plastic, metal, wood, or combinations thereof make up the rest of wall 31.

In most embodiments, while in installer area 13, the installer has access to fence 1 and storage area 14. This access allows the installer to take the intermediary material 7 found in storage area 14 and secure it to top rail 5 or any of the vertical posts (2, 3, 4). As the driver moves device 11, the installer has access to different areas of fence 1 and thus can quickly and efficiently install intermediary material 7 along the length of fence 1, with only two workers required. Alternatively, in some embodiments, one worker takes the place of both the driver and installer.

In most embodiments, device 11 is equipped with storage area 14 which comprises two main components, door 34 and container 35. In most embodiments when closed a combination of door 34, container 35, and storage base 36 supports and holds intermediary material 7 within storage space 37. In some embodiments a top is provided. In many embodiments storage space 37 comprises vertical posts and horizontal posts which keep intermediary material 7 from falling out of storage space 37. In most embodiments container 35 is fixed to the frame of device 11 and to base 25, and door 34 swings open and closed. In these embodiments, door 34 is a loading mechanism which when open puts device 11 into a loading position and when closed puts device 11 into a dispensing position. In most of these opening embodiments, door 34 is secured to container 35 by latch 38. In some embodiments container 35 comprises three of the four vertical sides of storage space 37, and in other embodiments container 35 comprises less than three sides, as shown in FIG. 1 where container 35 and door 34 each comprise two of the four sides of storage space 37. In some embodiments no door 34 is provided and container 35 comprises the entire vertical section of storage space 37. These embodiments are useful when intermediary material 7 is slats or similar loose material, as they can be loaded in from the top of storage space 37, which prevents the individual pieces from falling out of an open door 34.

In some embodiments storage base 36 is fixed to container 35 and in others it is fixed to door 34. In some embodiments storage base 36 is a non-rotating fixed piece, and in others it is a rotating wheel, as seen in FIG. 1. Non-rotating storage bases 36 are useful when intermediary material 7 is slats, or other materials which are not in a roll 10 and rotating storages bases 36 are useful when intermediary material 7 is in a roll 10. In some embodiments with rotating storage base 36, the base rotates on ball bearings. In other embodiments with rotating storage base 36, the base rotates on a plain bearing.

For embodiments where door 34 opens as a loading mechanism, in some embodiments it swings on hinge 49 placed on the vertical posts, such that it opens along the horizontal axis like a standard door. In most of these embodiments, intermediary material 7 is lifted up and placed vertically onto base 36, which in most of these embodiments is secured to container 35. In other embodiments door 34 swings on horizontal hinge 49 and opens in the vertical direction, so that when opened door 34 rests on the ground, as seen in FIG. 1. In most of these embodiments, intermediary material 7 is placed horizontally onto door 34, which is subsequently raised up and secured to container 35. In most of these embodiments base 36 is secured to door 34 so that when door 34 is raised up base 36 supports intermediary material 7. These embodiments are especially useful when intermediary material 7 is a large roll 10 as roll 10 can simply be rolled onto door 34. This loading method avoids the hassle of having to lift heavy and cumbersome roll 10 up onto storage base 36.

For embodiments where door 34 opens and closes, in some embodiments this process is completed manually and in others it is completed mechanically by lift mechanism 39. In some manual embodiments, door 34 is opened and closed simply by pushing up or pulling down on it, and in other embodiments a winch or other similar device is provided which aids in the manual moving of door 34. As seen in FIG. 1, in some embodiments lift control 40 is provided which controls lift mechanism 39. As discussed above, in some embodiments lift control 40 is provided through screen 48. In some embodiments lift mechanism 39 is a mechanical winch, in others a hydraulic piston or lift, and in others a motor. In some embodiments an electro hydraulic piston is used which beneficially combines high power with low energy output. For most of these embodiments the battery which runs the motor is charged by an alternator on motor 16.

Figure 6A:
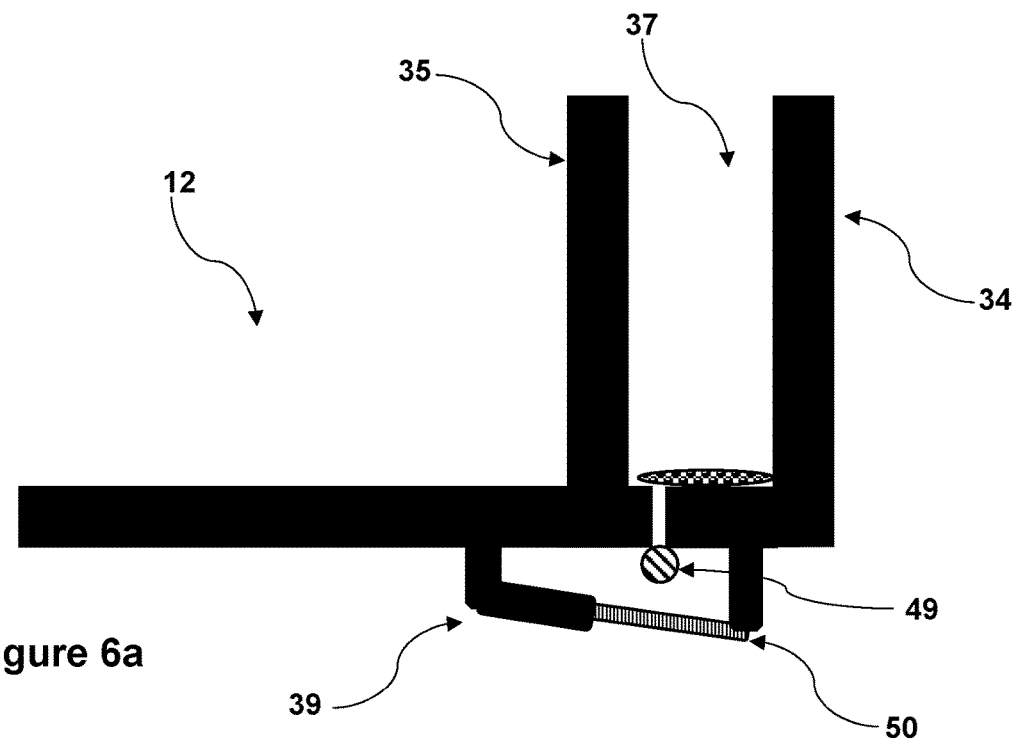
FIG. 6*a* shows a side view of the device for installing a fence shown in FIG. 1 in the closed position.
Figure 6B:
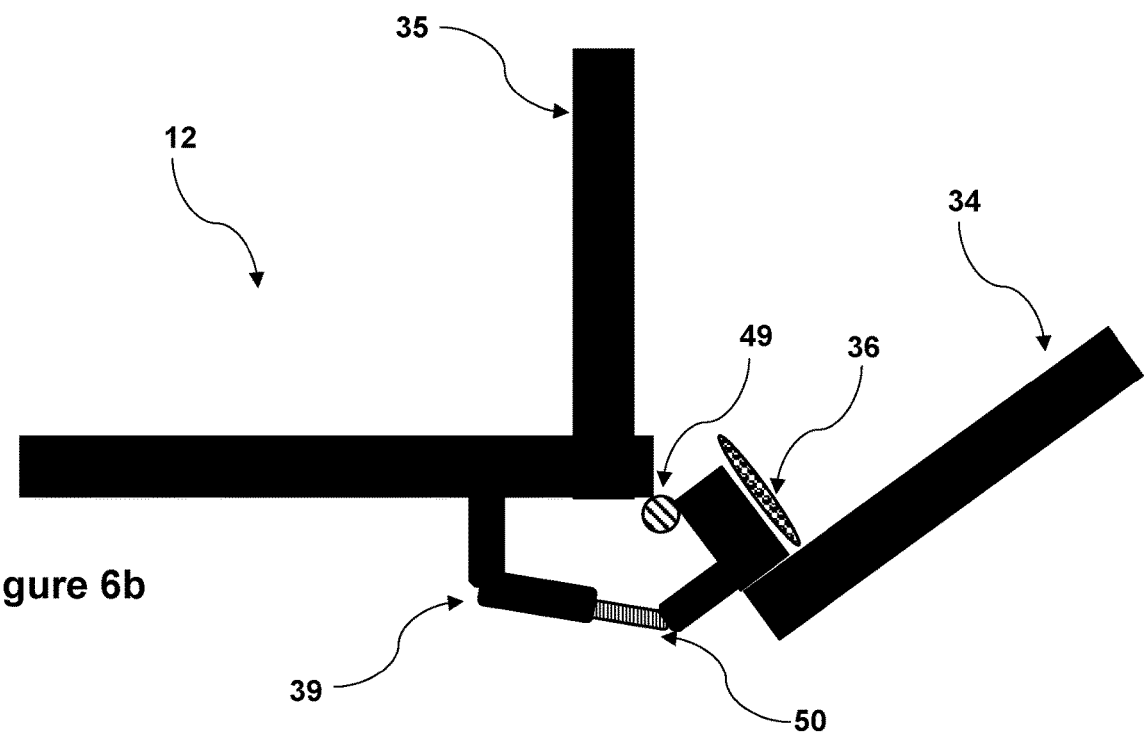
FIG. 6*b* shows a side view of the device for installing a fence shown in FIG. 1 in the partially opened position.

As seen in FIGS. 6a and 6b, in many embodiments with lift mechanism 39, one part of the lift mechanism 39 is secured to the bottom of door 34 and the other side to the bottom of driver area 12. In the embodiment shown in FIGS. 6a and 6b, lift mechanism 39 is a piston. As piston 50 is brought toward the back of device 11, door 34 is pulled downward (as seen in FIG. 6b), and when piston 50 is pushed towards the front of device 11, door 34 is pushed upwards to the closed position (as seen in FIG. 6a). These mechanical means of opening and closing door 34 are useful as the weight of roll 10 is in some embodiments prohibitive to manual lifting with a limited number of individuals.

Once intermediary material 7 is loaded into storage space 37, it is accessed by the installer either by pulling it from the top of storage space 37 or through a dispensing mechanism. In many embodiments the dispensing mechanism is gap 41 on the side of storage space 37. In some embodiments gap 41 is adjustable such that it can be opened to the specific size of the current intermediary material 7, and in others gap 41 is fixed such that it accommodates a variety of different intermediary material 7 sizes. In some embodiments guard 42 is provided. For embodiments where a side installer area 44 is provided, guard 42 protects this side area by blocking the impact of any object which may interact with this side area 44 that sticks out from the main frame of device 11. For embodiments where intermediary material 7 is a roll 10, guard 42 also gives a guiding and tension inducing line for intermediary material 7 traveling along track 43. In some embodiments, a track 43 is provided as part of the dispensing mechanism, which is beneficial when intermediary material 7 is a roll 10.

Figure 5:
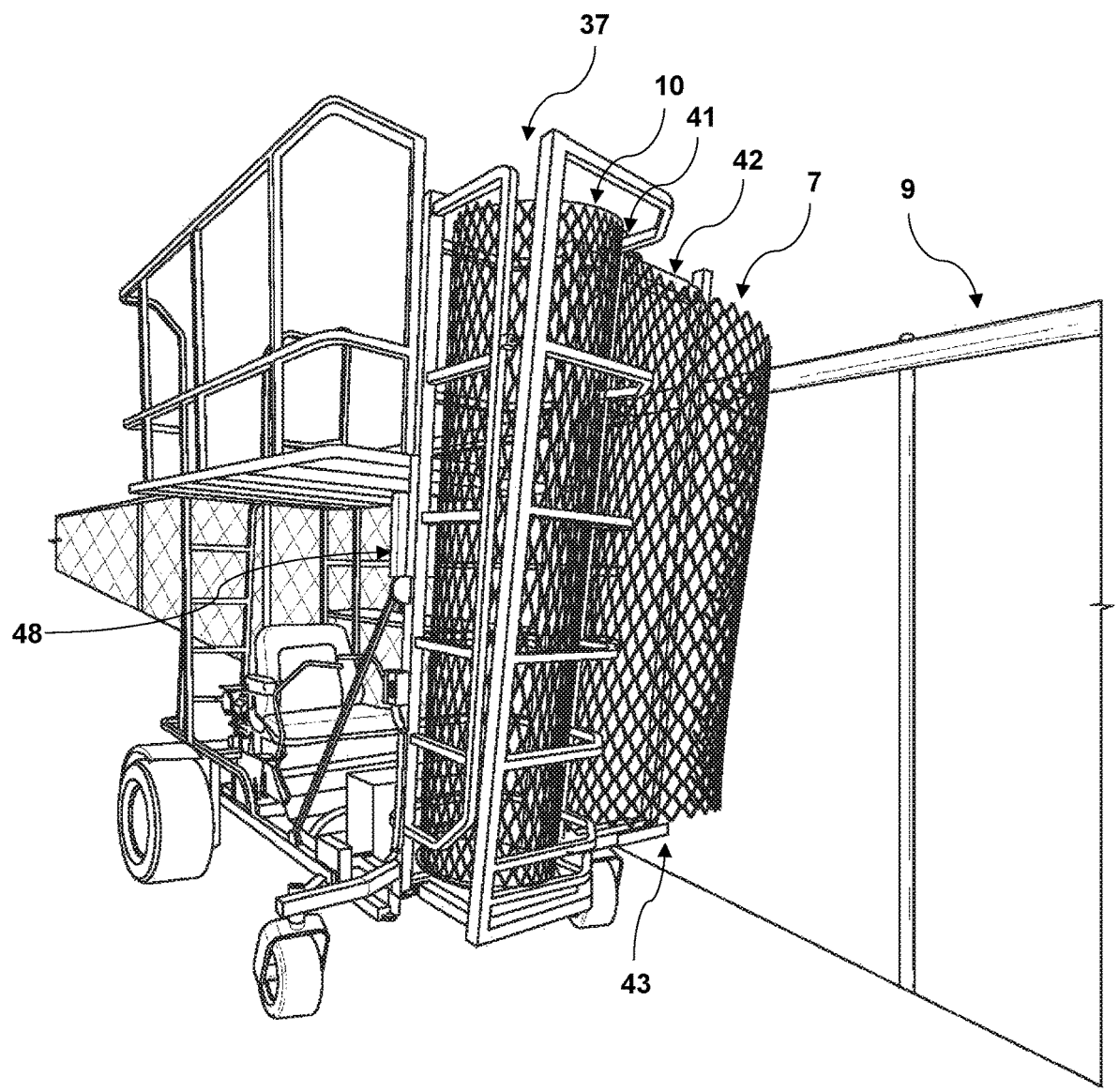
FIG. 5 shows the device for installing a fence shown in FIG. 1 in the process of installing a fence.

For many embodiments where intermediary material 7 is a roll 10, roll 10 is placed upon rotating storage base 36, and the beginning of roll 10 is fed out of gap 41 and guided by track 43, as shown in FIG. 5. As intermediary material 7 is fed out of gap 41 it rotates around on rotating storage base 36, which consistently allows more of intermediary material 7 to be fed out through gap 41. After securing intermediary material 7 to fence frame 9, the driver drives device 11 forward which, due to the secured area of intermediary material 7, causes more material to be pulled from roll 10. In some embodiments intermediary material 7 is temporally secured to fence frame 9 with a fence hanger or similar device, and subsequently permanently secured after the entire roll 10 is installed. Alternatively, the installer manually pulls intermediary material 7 out and the driver drives device 11 forward so that the installer has access to the next section of fence frame 9. In some embodiments, the weight of roll 10 creates enough tension in intermediary material 7 that the installer does not have to pull any tension in intermediary material 7 before securing the next section, and in others the installer manually or mechanically creates tension in intermediary material 7 as they go along before securing. In most embodiments the installer secures intermediary material 7 onto top rail 5, and in some embodiments also to intermediary posts 4, as device 11 progresses down fence 1. After completion of this task, intermediary material 7 can optionally be secured to bottom rail 6 and further secured to intermediary posts 4.

Alternatively, the driver can secure intermediary material 7 to the lower portions as they drive along fence 1. This process greatly reduces the amount of time and effort it takes to install intermediary material 7 along a fence.

In many embodiments the weight of roll 10 keeps intermediary material 7 secured to rotating base 36, but in other embodiments the inside of roll 10 is secured to rotating base 36. These embodiments are important when using lighter rolls 10, such as when using lighter plastic mesh. In some embodiments rotating base 36 rotates freely due to the weight of roll 10 and the tension between roll 10 and fence 1. In other embodiments rotating base 36 is motorized. In some embodiments rotating base 36 is connected to the wheel 15 axel and rotates as device 11 is driven forwards.

In most embodiments, storage space 37, gap 41, and track 43 are designed to fit a variety of intermediary materials 7. This is important as the different kinds of fences 1, such as picket, cross rail, and chain link, have different types of intermediary material 7. Even within similar groups there is variety in the materteral used. For example, in different embodiments, roll 10 comprises fence styles of chain link, poultry netting, welded wire, snow, mesh, and combinations thereof, which each can have different gauges and materials. In some embodiments roll 10 is made of metal and in others plastic. Device 11 in most embodiments is thus designed to accommodate these different fence 1 styles.

In some embodiments fence hangers are provided with device 11. In many embodiments these hangers are T shaped objects those length is slightly hooked and whose perpendicular width is straight. In many embodiments the hooked length is slid up through intermediary material 7 and hooks onto top rail 5 and the straight width catches on intermediary post 4. These fence hanger help maintain tension in intermediary material 7 as it is being pulled by device 11.

In addition to fence 1 construction, device 11 can be used whenever a material needs to be transported and placed at a relatively consistent height along the distance being transported. For example, barbed wire rolls can be placed within storage space 37 and installed in a similar way as discussed above. Similarly, rolls of wall paper can be installed, lights in street lights changed, banners hung, or other similar processes can all be completed using device 11, and as such it is not limited to the installation of fences.

In some embodiments, device 11 is provided as a stand-alone device including motor 16 and wheels 15, which allow device 11 to be driven. In other embodiments device 11 comprises installer area 13 and storage area 14 which are removably attached to a pre-existing motorized vehicle. These embodiments are useful as many companies may already have zero turn mowers, golf carts, all-terrain vehicles, or other similar motorized vehicles which are commonly used and do not want to buy and have to transport an entirely new vehicle, but would use device 11 attached to their pre-existing vehicle. In some embodiments, device 11 fits into pre-defined attachment ports on the vehicle and in others it is designed to attach onto a variety of vehicle styles. In most of these embodiments, driver area 12 is provided, but it is simply an empty space under installer area 13 and does not comprise motor 16 or other driving equipment, as these would be provided by the vehicle device 11 attaches onto.

While the present invention has been particularly described, it is evident that many alternatives, modifications and variations will be apparent to those skilled in the art in light of the foregoing description. These descriptions and drawings are exemplary of specific embodiments only and are not intended to be limiting to the scope of the invention defined in the claims. It is therefore contemplated that the claims will embrace any such alternatives, modifications, and variations as falling within the true scope and spirit of the present invention.

What is claimed:

1. A device for installing a fence comprising:
   a driver area;
   an installer area;
   a storage area;
   wherein said storage area comprises a loading position and a dispensing position;
   wherein said storage area further comprises a loading mechanism and a dispensing mechanism;
   wherein an object is placed within said storage area when said storage area is in said loading position and dispensed out of said storage area via said dispensing mechanism when said storage area is in said dispensing position;
   wherein said installer area is raised off of the ground, and wherein said device further comprises a ladder leading up to said installer area.

2. A device for installing a fence comprising:
   a frame;
   a motor;
   at least one wheel operated by said motor;
   a steering mechanism;
   a driver area;
   a first installer area supported above said driver area by at least one base support;
   a storage area;
   wherein said storage area comprises a loading position and a dispensing position;
   wherein said storage area further comprises a loading mechanism and a dispensing mechanism;
   wherein an object is placed within said storage area when said storage area is in said loading position and dispensed out of said storage area via said dispensing mechanism when said storage area is in said dispensing position;
   wherein said said first installer area further comprises a door.

3. The device according to claim 2, further comprising a ladder leading up to said door.

4. The device for installing a fence according to claim 1, wherein said loading mechanism is a door that opens and closes in a vertical direction, and wherein said loading position is when said door is opened such that it lays generally flat on a ground.

5. The device for installing a fence according to claim 4, further comprising a lift mechanism which opens and closes said door mechanically.

6. The device for installing a fence according to claim 4, wherein said door further comprises a rotatable base.

7. The device for installing a fence according to claim 1, wherein said dispensing mechanism is a track and a guard.

8. The device for installing a fence according to claim 1, further comprising a first and second installer area which are at different vertical heights from one another, and wherein said ladder leads up to said first installer area.

9. The device for installing a fence according to claim 8, wherein the vertical height of said second installer area is adjustable.

10. The device for installing a fence according to claim 1, wherein said storage area is generally placed in front of said driver area and said installer area.

11. The device for installing a fence according to claim 1, wherein said installer area further comprises a base and a rail.

12. The device according to claim 1, wherein said driver area further comprises a motor which drives said device.

13. The device according to claim 1, further comprising at least one wheel.

14. The device according to claim 13, further comprising at least one track on said at least one wheel.

15. The device according to claim 2, further comprising a second installer area offset from said first installer area.

16. The device according to claim 15, wherein said second installer area is removably attached to said base support.

17. The device according to claim 2, wherein said driver area further comprises a seat, and wherein said seat comprises a first and second position.

18. The device according to claim 2, further comprising at least one track on said at least one wheel.

* * * * *